United States Patent
Schmidt et al.

(10) Patent No.: US 11,566,842 B2
(45) Date of Patent: Jan. 31, 2023

(54) EMISSION ABATEMENT APPARATUS FOR PROCESSING OF PARTICULATES AND METHOD OF USING SAME

(71) Applicant: FLSmidth A/S, Valby (DK)

(72) Inventors: Iver Blankenberg Schmidt, Skørping (DK); Lars Skaarup Jensen, Vallensbæk (DK)

(73) Assignee: FLSmidth A/S

( * ) Notice: Subject to any disclaimer, the term of this patent is extended or adjusted under 35 U.S.C. 154(b) by 0 days.

(21) Appl. No.: 17/055,548

(22) PCT Filed: May 13, 2019

(86) PCT No.: PCT/IB2019/053935
§ 371 (c)(1),
(2) Date: Nov. 13, 2020

(87) PCT Pub. No.: WO2019/220309
PCT Pub. Date: Nov. 21, 2019

(65) Prior Publication Data
US 2021/0116179 A1  Apr. 22, 2021

Related U.S. Application Data

(60) Provisional application No. 62/671,724, filed on May 15, 2018.

(51) Int. Cl.
*F27B 7/20* (2006.01)
*C04B 7/36* (2006.01)
(Continued)

(52) U.S. Cl.
CPC ............ *F27B 7/2033* (2013.01); *C04B 7/364* (2013.01); *C04B 7/434* (2013.01); *F27D 17/008* (2013.01)

(58) Field of Classification Search
None
See application file for complete search history.

(56) References Cited

U.S. PATENT DOCUMENTS 4,059,392 A   11/1977   Touborg

FOREIGN PATENT DOCUMENTS

AU   2004285761 A1 * 5/2005 ............. C04B 7/364
DE       60300939 T2 * 5/2006 ............. C04B 7/434
(Continued)

OTHER PUBLICATIONS

DE-60300939-T2 English translation (Year: 2006).*
(Continued)

*Primary Examiner* — Steven S Anderson, II
*Assistant Examiner* — Kurt J Wolford
(74) *Attorney, Agent, or Firm* — Jeffrey A. Sharp

(57) ABSTRACT

A cement manufacturing plant can include at least one emission abatement mechanism. In some embodiments, the emission abatement mechanism can utilize a plurality of pulsed gases passed through a reactor to treat a solid particulate material passed through the reactor. The pulsed reactant gas can be pulsed through the reactor so that the pulsed gas passes from a middle portion of the reactor to a first end of the reactor at which the solid particulates can be fed into the reactor. In some embodiments, the reactant gas can be output from the first end to a down corner or other reactant gas conduit for transport to a treatment device.

9 Claims, 6 Drawing Sheets

(51) Int. Cl.
*C04B 7/43* (2006.01)
*F27D 17/00* (2006.01)

(56) References Cited

FOREIGN PATENT DOCUMENTS

| WO | 2004031092 A1 | 4/2004 | | |
|---|---|---|---|---|
| WO | WO-2007128619 A1 * | 11/2007 | ............. | C04B 7/365 |
| WO | WO-2013019393 A1 * | 2/2013 | ............. | B01D 53/46 |
| WO | 2017125579 A1 | 7/2017 | | |

OTHER PUBLICATIONS

Mechatrofice, Solenoid valve control using Arduino (Year: 2017).*
International Search Report and Written Opinion dated Sep. 24, 2019, 10 pages.

* cited by examiner

S101 Install at least one emission abatement mechanism 21 in a cement manufacturing facility that processes raw meal in the cement clinker production process S102 Pass raw meal from a first separator (e.g. a cyclone) to a second separator via conduit such that the raw meal is passed through a reactor as the raw meal moves from the first separator to the second separator S103 Introducing a gas in the reactor adjacent a bottom bed of the reactor in pulses (e.g. multiple spaced apart duration of a cycle of feeding gas into the reactor at which: (a) for a pre-selected pulse time period a continuous flow of gas is passed into the reactor 21a at a pre-selected flow rate and (b) immediately following the first pre-selected pulse time period there is a cessation for a pre-selected cessation time period. Steps (a) and (b) can be repeated a number of times to feed the gas into the reactor in pulses. The duration of each pulse (e.g. the duration of the pre-selected pulse time period at which gas is flowed into the reactor at a pre-selected flow rate can be in the range of 0.5-5 milliseconds or some other pulse time range (e.g. up to 1 second, up to 5 seconds, up to 25 seconds, up to 1 minute, etc.).. The cessation time period between pulses can be in the 0.5-5 millisecond time period or another cessation time period (e.g. up to 1 second, up to 5 seconds, up to 1 minute, etc.).

S104 After the cement raw meal is passed through the reactor, the cement raw meal is fed to the second separator.

S105 The processed cement raw meal is fed to a calciner or kiln.

FIG. 6

EMISSION ABATEMENT APPARATUS FOR PROCESSING OF PARTICULATES AND METHOD OF USING SAME

FIELD

The present innovation relates to processing of solid particulates. Such processing can occur, for example, in cement manufacturing and the processing of cement raw meal, or raw meal. For example, embodiments of the present innovation can provide an apparatus configured to help abate emissions of undesired compositions in connection with processing of raw meal in cement clinker production, an arrangement of one or more apparatuses within a cement manufacturing plant, kits for upgrading a cement manufacturing plant to include at least one such apparatus and methods of making and using the same.

BACKGROUND

Cement factories, or cement plants, often process cement meal dust. Examples of cement manufacturing factories, or cement manufacturing plants, can be appreciated from U.S. Pat. Nos. 4,997,363, 5,800,610, 5,954,499, 6,000,937, 7,052,274, 7,390,357, 7,972,419, 8,163,082, and 8,474,387, U.S. Patent Application Publication No. 2010/0180803 and International Publication Nos. WO 2004/031092, WO 2014/04843, WO 2017/060369, and WO 2017/125579. Such cement manufacturing can often utilize a series of cyclones.

SUMMARY

An emission abatement apparatus, a cement manufacturing apparatus having at least one emission abatement apparatus, a kit for retrofitting a preheater to include at least one emission abatement apparatus, and methods of making and using the same are provided herein. Embodiments can be configured to facilitate an improved operation of operations that also allow for improved control of gas emissions to the environment.

For instance, embodiments of a cement manufacturing apparatus can include a pre-heater connected to a calciner to pre-heated cement raw meal to the calciner. The pre-heater can include a first separator device, a second separator device, and an emission abatement apparatus positioned between the first separator device and the second separator device. The emission abatement apparatus can include a reactor having a first end, a second end opposite the first end, and a middle portion between the first end and the second end. The first end of the reactor can be connected to a cement raw meal conduit so that cement raw meal output from the first separator device is feedable to the first end of the reactor. The second end of the reactor can be connected to a flue gas conduit such that the cement raw meal passed through the reactor is passable from the second end of the reactor to the flue gas conduit so that the cement raw meal is directed to the second separator device via the flue gas conduit. The middle portion of the reactor can be connectable to a source of reactant gas such that reactant gas from the source of reactant gas is feedable into the middle portion of the reactor in a plurality of pulses.

The middle portion of the reactor can be an intermediate section of the reactor between the first end of the reactor and the second end of the reactor. The middle portion does not have to be in a central portion of the reactor, but in some embodiments, it can be located in the central portion of the reactor.

In some embodiments of the cement manufacturing apparatus, the middle portion of the reactor is below the first end of the reactor and is below the second end of the reactor. For reactors that include multiple stages, each stage can have its own respective middle portion at which transport gas and/or reactant gas is feedable where that middle portion is between opposed ends of that stage. The middle portion of each stage may be positioned below the intake end and the output end of the stage in such embodiments. The middle portion of such an exemplary reactor can be any of these middle portions of the reactor stages. For embodiments that utilize multiple stages, the stages can be arranged in series so that a first stage feed processed raw meal to a second stage and the second stage output the processed raw meal or sends the raw meal to yet another stage (e.g. a third stage) downstream of the second stage. There may be any number of stages arranged in series such that cement raw meal is directly fed from an upstream stage to the immediately next downstream stage and so that the last stage outputs the processed cement raw meal.

The plurality of pulses of the reactant gas can be configured so that each pulse has a pre-selected pulse time period at which the reactant gas is fed into the middle portion of the reactor and immediately after the pre-selected pulse time the reactant gas is stopped being fed into the middle portion of the reactor for a cessation time period that runs immediately after the pre-selected pulse time ends. The pre-selected pulse time can be up to 0.01 seconds, 1 microsecond, 1 millisecond, 5 milliseconds, 10 milliseconds, or 1 second or another pre-selected time period. A cessation period can separate pulses to define a break between pulses such that each pulse is a discrete flowing of fluid and the plurality of pulses are not a continuous flow of fluid. Each cessation period can be the same time period or can be differing time period. For instance, a cessation time period can be a pre-selected cessation time for after a particular pulse. An exemplary cessation time period can be up to 1 microsecond, up to 1 millisecond, up to 0.0001 seconds, up to 0.01 seconds, up to 5 milliseconds, up to 10 milliseconds, up to 0.5 seconds, up to 1 second, up to 2 seconds, up to 25 seconds, up to a minute, etc. The cessation time period after a particular pulse can be defined by a control loop that is implemented by a controller connected to valves or other reactant gas flow control mechanism that facilitates the feeding of reactant gas into the reactor. The control loop can define variations in pulse times and cessation time periods for different operating conditions or other parameters that may be monitored by sensors and a controller connected to those sensors. The control loop settings for a first reactor can be different than the control loop settings for other reactors (e.g. a second reactor and/or a third reactor) that may be present in a preheater to account for different conditions at the different reactor positions to meet a particular set of operational objectives. Each reactor can therefore have a unique pulse time period setting and a unique cessation time period setting in some embodiments. Additionally, how such pulse time periods and cessation time periods may vary could be different depending on the position of the reactor or could be configured to be the same to meet a particular set of operational objectives.

The middle portion of the reactor can be connected to a transport gas source such that transport gas is feedable into the middle portion of the reactor in a plurality of pulses such that the transport gas is passable from the middle portion of the reactor to the second end of the reactor. The middle portion of the reactor can also be connected to the source of reactant gas such that the reactant gas passes from the middle portion of the reactor to the first end of the reactor. The reactant gas can be fed into the reactor in pulses as well. The pulses may be synchronized with the pulses of the transport gas or may not be synchronized with the pulses of the transport gas. In yet other embodiments, the reactant gas may be pre-mixed with the transport gas prior to the gases being fed into the reactor via pulses. In some embodiments, it is contemplated that a proportion of the transport gas and/or the reactant gas can be fed at a constant flow rate. For such embodiments, pulses of transport gas and/or reactant gas can also be fed into the reactor to increase the flow of such a gas in pulses. The pulsing of the reactant gas and/or transport gas can therefore occur to supplement a constant flow of such gas to provide pulses of increased flow rates of such gas.

The reactor can be configured to have a particular type of shape. For instance, the reactor can be configured to have a generally W-like shape, a generally U-shape or a generally V-shape.

Embodiments of an emission abatement apparatus can include a reactor having a first end, a second end opposite the first end, and a middle portion between the first end and the second end. The first end of the reactor can be configured for connection to a solid particulate conduit through which solid particulates are feedable to the reactor. The second end of the reactor can be configured for connection to a gas conduit such that solid particulates passed through the reactor are passable to the gas conduit. The middle portion of the reactor can be connectable to a source of reactant gas such that reactant gas from the source of reactant gas is feedable into the middle portion of the reactor in a plurality of pulses.

The middle portion of the reactor can be an intermediate section of the reactor between the first end of the reactor and the second end of the reactor. The middle portion of the reactor can be a central section of the reactor or may be another intermediate section of the rector (e.g. closer to the first end or close to the second end and between the first and second ends, etc.). The middle portion of the reactor can be positioned below the first end of the reactor and can also be below the second end of the reactor.

In some embodiments, the middle portion of the reactor of the emission abatement apparatus can be below the first end of the reactor and can also be below the second end of the reactor. For reactors that include multiple stages, each stage can have its own respective middle portion at which transport gas and/or reactant gas is feedable where that middle portion is between opposed ends of that stage. The middle portion of each stage may be positioned below the intake end and the output end of the stage in such embodiments. The middle portion of such an exemplary reactor can be any of these middle portions of the reactor stages.

The plurality of pulses of the reactant gas can be configured so that each pulse has a pre-selected pulse time period at which the reactant gas is fed into the middle portion of the reactor and immediately after the pre-selected pulse time the reactant gas is stopped being fed into the middle portion of the reactor for a cessation time period that runs immediately after the pre-selected pulse time ends. The pre-selected pulse time can be any pre-selected time period that is selected to meet a particular set of design criteria. For instance, the pre-selected time period can be up to 0.01 seconds, 1 microsecond, 1 millisecond, 5 milliseconds, 10 milliseconds, or 1 second. The cessation time period can be any pre-selected time period that is selected to meet a particular set of design criteria as well. For instance, the pre-selected cessation time period can be up to 0.01 seconds, 1 micro-second, 1 millisecond, 5 milliseconds, 10 milliseconds, or 1 second. The pulse time period and the cessation time periods can be varied for different reactors depending on the position of the reactor and the operational objective for that reactor. The pulse time period and the cessation time period can also be varied during operations to account for operational parameters of a pre-heater or to meet a particular set of operational objectives. In some embodiments, it is contemplated that a proportion of the reactant gas can be fed at a constant flow rate. For such embodiments, pulses of the reactant gas can also be fed into the reactor to increase the flow of the reactant gas in pulses. The pulsing of the reactant gas can therefore occur to supplement a constant flow of the reactant gas to provide pulses of increased flow rates of the reactant gas.

The middle portion of the reactor can also be configured to connect to a transport gas source such that transport gas is feedable into the middle portion of the reactor in a plurality of pulses such that the transport gas is passable from the middle portion of the reactor to the second end of the reactor. The middle portion of the reactor can also be connectable to the source of reactant gas such that the reactant gas passes from the middle portion of the reactor to the first end of the reactor. In some embodiments, the transport gas can be pre-mixed with the reactant gas prior to the gases being fed into the reactor. In other embodiments, the transport gas and the reactant gas can be fed into the reactor separately in synchronized pulses or non-synchronized pulses (e.g. at the same time in the same pulses having the same pulse durations, at the same time with different pulses having different pulse durations, or at different times using the same types of pulses or different pulses), etc.).

The reactor can have a generally U-shape or a generally V-shape. In other embodiments, the reactor can have a W-like shape or other shape. In yet other embodiments, the emission abatement apparatus can be considered to include multiple reactors arranged in series.

For instance, some embodiments of the emission abatement apparatus can include a first reactor having a first end, a second end opposite the first end, and a middle portion between the first end and the second end. The first end of the first reactor can be configured for connection to a solid particulate conduit through which solid particulates are feedable to the reactor. The second end of the first reactor can be configured for connection to a first end of a second reactor. The second reactor can receive solid particulates from the first reactor via the connection between the first end of the second reactor and the second end of the first reactor. The second reactor can include a second end and a middle portion between the first end of the second reactor and the second end of the second reactor. The second end of the second reactor can be connectable to a gas conduit such that solid particulates passed through the second reactor (after having also passed through the first reactor) are passable to the gas conduit. The middle portion of the first reactor can be connectable to a source of reactant gas such that reactant gas from the source of reactant gas is feedable into the middle portion of the first reactor in a plurality of pulses. The middle portion of the second reactor can also be connectable to a source of reactant gas (e.g. the same source of reactant gas as the middle portion of the first reactor or a different source of reactant gas) such that reactant gas from the source of reactant gas is feedable into the middle portion of the second reactor in a plurality of pulses.

In some embodiments of the emission abatement apparatus having reactors in series, the emission abatement apparatus can be considered to have a double U-like shape, a triple U-like shape or other type shape (e.g. a double V-like shape, etc.). Some embodiments of the emission abatement apparatus can be considered to include first and second rector stages that are arranged in series to define a single reactor instead of being considered as including multiple reactors aligned in series.

The reactant gas fed to the first and/or second reactors can be pre-mixed with a transport gas. Alternatively, at least one transport gas source can be connected to the first reactor and at least one transport gas source can be connected to the second reactor for feeding the transport gas to the reactors. The transport gases can be fed into the reactors in pulses that are synchronized with the reactant gas fed therein or are not synchronized with the reactant gas fed therein.

A method of retrofitting a pre-heater of a cement manufacturing plant with at least one emission abatement apparatus can include positioning an emission abatement apparatus in the pre-heater between a first separator device and a second separator device. The emission abatement apparatus can include a reactor having a first end, a second end opposite the first end, and a middle portion between the first end and the second end. The first end of the reactor can be connectable to a cement raw meal conduit so that cement raw meal output from the first separator device is feedable to the first end of the reactor. The second end of the reactor can be connectable to a flue gas conduit such that the cement raw meal passed through the reactor is passable from the second end of the reactor to the flue gas conduit so that the cement raw meal is directed to the second separator device via the flue gas conduit. The middle portion of the reactor can be connectable to a source of reactant gas such that reactant gas from the source of reactant gas is feedable into the middle portion of the reactor in a plurality of pulses. The method can also include feeding cement raw meal from the first separator device to the first end of the reactor for passing the cement raw meal through the reactor, pulsing the reactant gas into the middle portion of the reactor in a plurality of pulses as the cement raw meal is passed through the reactor so that the cement raw meal contacts the pulsed reactant gas as the cement raw meal moves from the first end of the reactor to the middle portion of the reactor, and outputting the cement raw meal from the second end of the reactor to the flue gas conduit after the cement raw meal has contacted the reactant gas pulsed through the middle portion of the reactor.

The middle portion of the reactor of the emission abatement apparatus can be an intermediate section of the reactor between the first end of the reactor and the second end of the reactor in embodiments of the method. For instance, the middle portion of the reactor can be a central section of the reactor or a portion that is between the first and second ends of the reactor that is not a central section of the reactor. In some embodiments, the middle portion of the reactor can be below the first end of the reactor and can also be below the second end of the reactor.

In some embodiments of the method, the middle portion of the reactor of the emission abatement apparatus can be below the first end of the reactor and can also be below the second end of the reactor. For reactors that include multiple stages, each stage can have its own respective middle portion at which transport gas and/or reactant gas is feedable where that middle portion is between opposed ends of that stage. The middle portion of each stage may be positioned below the intake end and the output end of the stage in such embodiments. The middle portion of such an exemplary reactor can be any of these middle portions of the reactor stages. Reactant gas can be fed in pulses into each middle section of each stage of the reactor. For instance, a method can include pulsing the reactant gas into the middle portion of a first reactor stage in a plurality of pulses as the cement raw meal is passed through the reactor so that the cement raw meal contacts the pulsed reactant gas as the cement raw meal moves from the first end of the reactor to the second end of the reactor and pulsing the reactant gas into the middle portion of a second reactor stage in a plurality of pulses as the cement raw meal is passed through the reactor so that the cement raw meal contacts the pulsed reactant gas as the cement raw meal moves from the first end of the reactor to the second end of the reactor.

For embodiments of the emission abatement apparatus that utilize multiple stages, the stages can be arranged in series so that a first stage feeds processed raw meal to a second stage and the second stage output the processed raw meal or sends the raw meal to yet another stage (e.g. a third stage) downstream of the second stage. There may be any number of stages arranged in series such that cement raw meal is directly fed from an upstream stage to the immediately next downstream stage and so that the last stage outputs the processed cement raw meal.

The plurality of pulses of the reactant gas can be configured so that each pulse has a pre-selected pulse time period at which the reactant gas is fed into the middle portion of the reactor and immediately after the pre-selected pulse time the reactant gas is stopped being fed into the middle portion of the reactor for a cessation time period that runs immediately after the pre-selected pulse time ends. The pre-selected pulse time can be any pre-selected time period that is selected to meet a particular set of design criteria. For instance, the pre-selected time period can be up to 0.01 seconds, 1 microsecond, 1 millisecond, 5 milliseconds, 10 milliseconds, or 1 second. The cessation time period can be any pre-selected time period that is selected to meet a particular set of design criteria as well. For instance, the pre-selected cessation time period can be up to 0.01 seconds, 1 microsecond, 1 millisecond, 5 milliseconds, 10 milliseconds, or 1 second. The pulse time period and the cessation time periods can be varied for different reactors depending on the position of the reactor and the operational objective for that reactor. The pulse time period and the cessation time period can also be varied during operations to account for operational parameters of a pre-heater or to meet a particular set of operational objectives. In some embodiments, it is contemplated that a proportion of the reactant gas can be fed at a constant flow rate. For such embodiments of the method, pulses of the reactant gas can also be fed into the reactor to increase the flow of the reactant gas in pulses. The pulsing of the reactant gas can therefore occur to supplement a constant flow of the reactant gas to provide pulses of increased flow rates of the reactant gas.

The middle portion of the reactor can be connectable to a transport gas source such that transport gas is feedable into the middle portion of the reactor. For such embodiments, the method can also include feeding the transport gas into the middle portion of the reactor in pulses such that the transport gas passes from the middle portion of the reactor to the second end of the reactor. The transport gas can be fed into the middle portion of the rector in pulses so that the transport gas is fed synchronously with the reactant gas or asynchronously with the reactant gas. In some embodiments of the method, it is contemplated that a proportion of the transport gas can be fed at a constant flow rate. For such embodiments of the method, pulses of the transport gas can also be fed into the reactor to increase the flow of the transport gas in pulses. The pulsing of the transport gas can therefore occur to supplement a constant flow of the transport gas to provide pulses of increased flow rates of the transport gas.

In some embodiments of the method, the emission abatement apparatus can include multiple reactors arranged in series or can include a reactor that has multiple rector stages positioned in series. Some embodiments of such a reactor can be configured to have a double U-like shape or a triple U-like shape or other shape (e.g. double V-like shape, W-like shape, etc.).

Other details, objects, and advantages of the emission abatement apparatus, a cement manufacturing plant, a kit for retrofitting a plant with at least one emission abatement apparatus, and a kit for retrofitting a pre-heater for such a plant with at least one emission abatement apparatus, and methods of making and using the same will become apparent as the following description of certain exemplary embodiments thereof proceeds.

BRIEF DESCRIPTION OF THE DRAWINGS

Exemplary embodiments of an emission abatement apparatus, a cement manufacturing plant, a kit for retrofitting a plant with at least one emission abatement apparatus, an emission abatement apparatus for use in cement manufacturing plants that process cement raw meal in the cement clinker production process, and methods of making and using the same are shown in the accompanying drawings. It should be understood that like reference numbers used in the drawings may identify like components.

FIG. 6 is a flow chart illustrating an exemplary method for processing raw meal in the cement clinker production process.

DETAILED DESCRIPTION OF EXEMPLARY EMBODIMENTS

Figure 1:
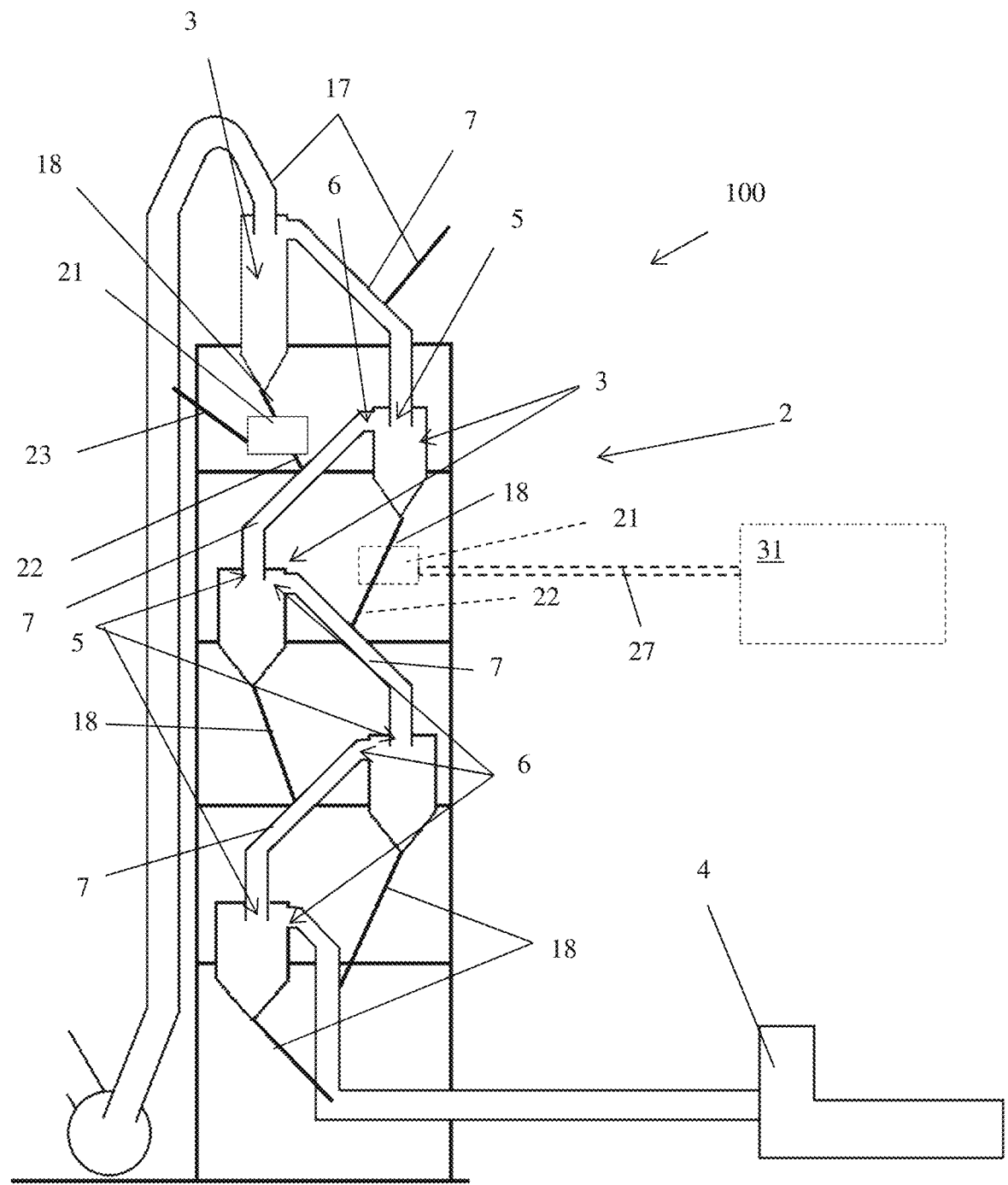
FIG. 1 is schematic view of a first exemplary embodiment of a cement manufacturing plant.

Referring to FIGS. 1-6, a cement manufacturing plant 100 can include a calciner (or kiln) that combusts a fuel or utilizes hot gases from a combustor that combusts a fuel. Exhaust gas, or flue gas, from a combustor or other process element that emits hot gas can be passed through a pre-heater 2 for pre-heating cement raw meal material (e.g. solid particulates used in processing for the formation of cement) prior to the cement raw meal being fed to the calciner or other processing device. In some embodiments, the cement raw meal processed in the calciner and/or kiln can be output from the kiln or calciner to a clinker cooler 4.

The cement raw meal can be particulates that are obtained from the comminution of a source material such as, for example, limestone, and can also include other materials such as additives that can be added to the comminuted material (e.g. clay, sand, iron ore, or other additives that can help provide a desired composition for the cement raw meal to be fed to the pre-heater 2). The cement raw meal can be solid particulates that have small size ranges (e.g. a powder of solid particulates, etc.). An exemplary size range for cement raw meal can be in the 100-50 micrometer range, in the 150-25 micrometer range, or in other small sized ranges.

The pre-heater 2 can include a series of separator devices 3. Each separator device can be configured to separate solid particulates from gas in which the particulates are entrained. The number of separator devices 3 that are included can depend on a pre-selected set of design criteria. For instance, the series of separator devices 3 can include a plurality of separator devices 3 that can include a first separator device, a second separator device, a third separator device, a fourth separator device, and a fifth separator device. For example, there can be a top separator device 3, a bottom separator device 3, and one or more intermediate separator devices 3 between the top and the bottom separator devices 3. The separator devices can be configured as cyclones or cyclone separators in some embodiments. The flue gas may pass from a combustor to which the calciner is connected to the bottom separator device 3 and subsequently pass through the one or more intermediate separator devices 3 positioned above the bottom separator device 3 in the pre-heater 2 before passing through the top separator device 3 of the pre-heater 2.

As can be seen from the exemplary embodiment shown in FIG. 1, cement raw meal can be fed into the pre-heater 2 via the top separator device 3. A feed conduit 17 or other type of feed mechanism can facilitate feeding of the cement raw meal into the top separator device 3. As can be seen in FIG. 1, there may be more than one such feed conduit 17 for feeding the cement raw meal for processing by the top separator device 3. For example, some cement raw meal can be fed into the top separator devices 3 via a feed conduit 17 that introduces the cement raw meal into flue gas that is passing from a lower separator device 3 to the top separator device 3 (e.g. in a flue gas conduit 7 that may feed flue gas into a separator device) while another feed conduit provides cement raw meal to the top separator device 3. Cement raw meal that is heated in the top separator device 3 can be transported to another lower stage separator device 3 via a cement raw meal outlet conduit 18 that may extend from an upper separator device 3 to a flue gas conduit 7 that feeds flue gas to a lower stage separator device 3 so that the cement raw meal intermixes with the flue gas prior to being fed into the lower stage separator device 3 for separation from the flue gas and output to another lower stage separator device 3.

The cement raw meal may pass through one or more of the separators in countercurrent flow with the flue gas and absorb heat from the flue gas as the cement raw meal passes out of the separator device 3 and toward calciner 4 for feeding to the calciner 4. The heated cement raw meal may pass out of a bottom outlet or other outlet of a separator device 3 for transport to another pre-heater element via a cement raw meal conduit 18 (e.g. a type of solid particulate conduit). The flue gas may pass out of the separator device 3 near a top or near an upper region of the separator device 3 at a flue gas exit, or flue gas outlet 5, that is in fluid communication with a flue gas conduit 7 that can extend form one separator device 3 to another separator device 3 of the pre-heater.

Each separator device 3 can have a body that defines an inner chamber that is in fluid communication with the cement raw meal outlet conduit 18 and the flue gas inlet 6 and flue gas outlet 5 so that the inlet and outlets are in communication with the inner chamber defined by the body of the separator device to facilitate the ingress and egress of the flue gas and the receipt and output of the cement raw meal. The body can be configured so that flue gas mixes with the cement raw meal within the body of the separator device so that the solid particulate cement raw meal is heated by the flue gas and is separated from the flue gas by the particulates passing through a bottom or lower cement raw meal outlet conduit 18 and the flue gas (without the solid particulates that are intermixed therewith for the transport of heat from the hotter flue gas and the cooler cement raw meal) passing through an upper flue gas outlet 5 conduit to a flue gas conduit 7.

Cement raw meal conduits 18 can extend from a cement raw meal outlet of a separator device to a flue gas conduit 7 that extends from a flue gas outlet 5 of a lower separator device 3 to a flue gas inlet 6 of an upper separator device. The bottom most separator device 3 can be connected to a conduit for feeding the cement raw meal output from the cement raw meal outlet of the bottommost separator device 3 to the calciner 4. The pre-heater 2 can also include at least one emission abatement apparatus 21.

For instance, in some embodiments a first emission abatement apparatus 21 can be positioned between the top separator device and the second highest separator device (e.g. between a first stage separator device 3 and a second stage separator device 3). In other embodiments, a first emission abatement apparatus 21 can be provided between a second stage separator device 3 and a third stage separator device 3 below the second stage separator device 3 as shown in broken line in FIG. 1. In yet other embodiments, the pre-heater 2 can include multiple emission abatement apparatuses 21 located between different separator device stages (e.g. including both a first emission abatement apparatus 21 between the first and second separator stages as shown in solid line in FIG. 1 and including a second emission abatement apparatus 21 between the second and third stages as shown in broken line in FIG. 1, etc.). For embodiments including one or more emission abatement apparatuses 21, cement raw meal output from a separator device 3 may be conveyed via a cement raw meal conduit 18 to the emission abatement apparatus 21 for processing prior to the processed cement raw meal being fed to a lower stage separator device flue gas conduit 7 that is feeding flue gas to the lower stage separator device 3 via the flue gas inlet 6 of that separator device 3. Process gas that can be utilized to process the cement raw meal via the emission abatement apparatus 21 to remove undesireable constituents from the cement raw meal can be output from an emission abatement apparatus 21 to a treatment device 31 or to a cement raw meal feed conduit that feeds cement raw meal to the top separator device 3 or the first stage separator device 3 of the pre-heater 2.

Figure 2:
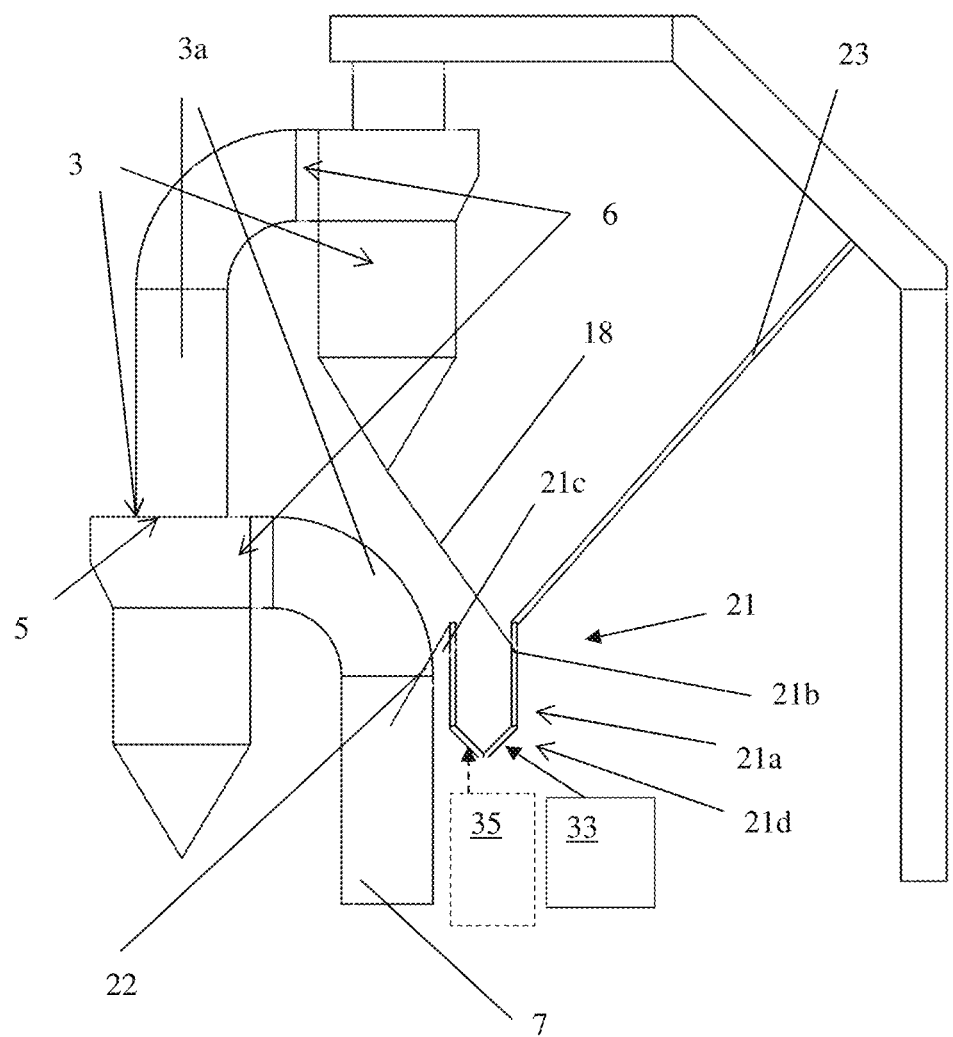
FIG. 2 is a fragmentary schematic view of an exemplary emission abatement apparatus that can be included in the first exemplary embodiment of the cement manufacturing plant.
Figure 4:
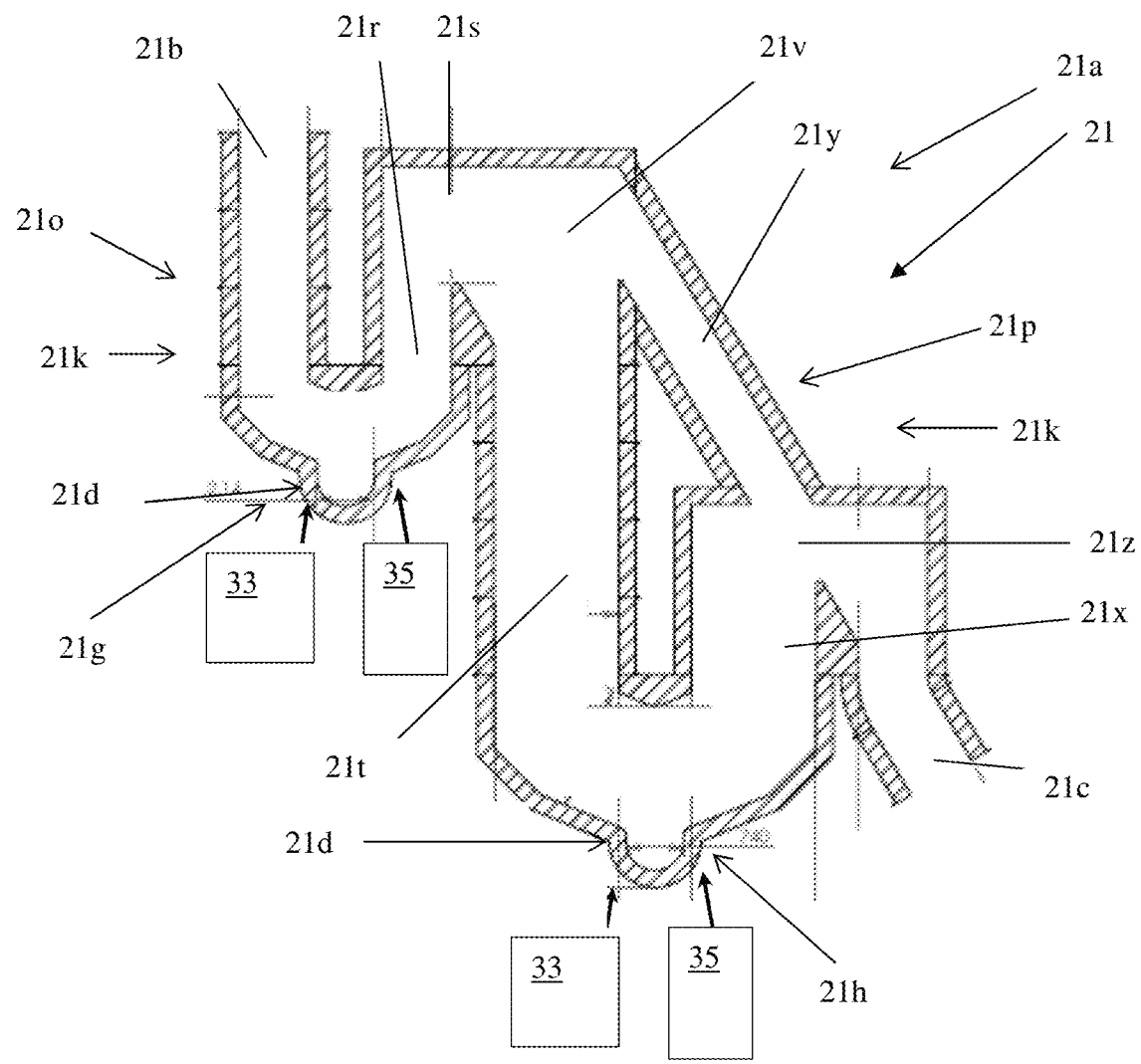
FIG. 4 is a fragmentary schematic view of an exemplary emission abatement apparatus that can be included in the first exemplary embodiment of the cement manufacturing plant.
Figure 5:
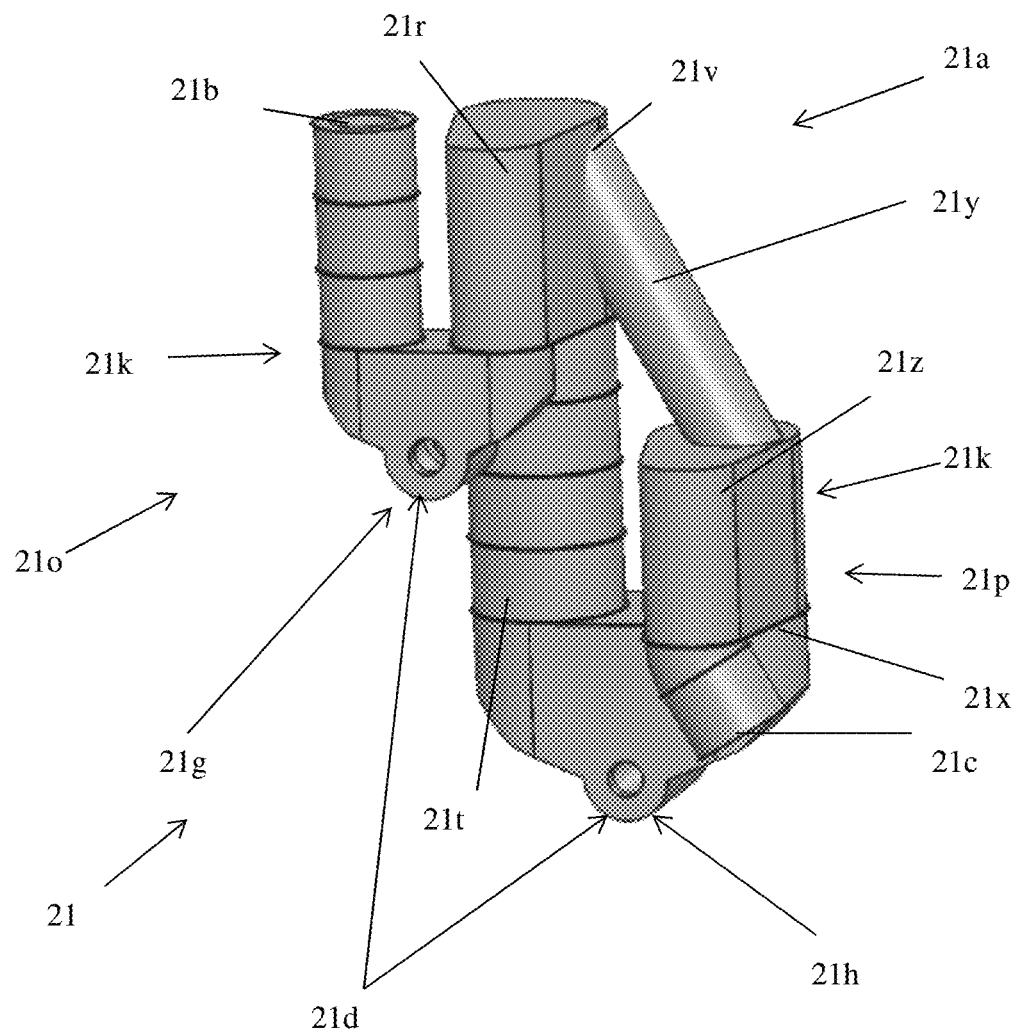
FIG. 5 is a fragmentary perspective view of an exemplary emission abatement apparatus that can be included in the first exemplary embodiment of the cement manufacturing plant.

Referring to FIG. 2, a first exemplary embodiment of a cement manufacturing plant 100 having an emission abatement apparatus 21 positioned between the first and second stage separator devices 3 is shown to better illustrate an exemplary configuration for the emission abatement apparatus 21. Cement raw meal separated in the top separator device 3 is output via cement raw meal conduit 18 to a reactor 21a of the emission abatement apparatus 21. The reactor 21a can be structured as a tubular or conduit-type structure that has a pre-selected shape (e.g. a U-shaped profile, a V-shaped profile, a V-like shaped profile, a U-like shaped profile, etc.) to facilitate a desired reaction of the cement raw meal with at least one reactant gas fed into the reactor 21a. The body of the reactor 21a shown in FIG. 2 can include a tubular structure (e.g. a pipe, tube, polygonal shaped conduit defining an inner chamber through which cement raw meal is passable, etc.) that extends from a first end 21b coupled to the cement raw meal conduit 18 to a second end 21c. The second end 21c of the reactor 21a can be connected to a reactor cement raw meal outlet conduit 22 that is coupled to a flue gas conduit 7. The reactor 21a can extend between its first end 21b and second end 21c such that the tubular structure of the reactor 21a has a generally U-like shape or a generally V-like shape. Of course, it should be understood that the body of the reactor 21a can have other shapes such as a C-shape, a Y shape, a J shape, or other type of shape (e.g. a W-like shape as shown in FIGS. 4 and 5, etc.).

In some embodiments, the shape of the reactor 21a can be configured so that there is relatively small height differential between the first end 21b and the second end 21c. Such a feature can allow the height profile requirement for the reactor 21a to have a minimal impact on pre-heater height requirements.

The reactor 21a can include a middle portion 21d that is between its first end 21b and its second end 21c. In some configurations, the middle portion 21d can be the bottom portion of the reactor 21a at which cement raw meal particulates may collect as the cement raw meal passes through the reactor 21a. Pulses of a reactant gas can be passed into the reactor at the bottom portion or middle portion 21d from a reactant gas source 33. The flow rate and duration of the flow of reactant gas from the reactant gas source 33 can be controlled via a valve between the reactant gas source 33 and the reactor 21a that is connected to a reactant gas source feed conduit through which the reactant gas passes to be fed from the reactant gas source 33 to the reactor 21a. The flow of reactant gas can also be controlled by controlling valves or nozzles at the reactant gas feed inlets in the middle portion 21d of the reactor at which the reactant gas is passed into the reactor 21a for contact with the cement raw meal passing through the reactor 21a. The pulsing of the reactant gas can be controlled so that the pulses occur at certain intervals. For example, each pulse of the reactant gas can occur such that the gas is passed into the reactor 21a continuously for a pre-selected pulse time period and, at the end of the pre-selected pulse time period, the reactant gas is prevented from flowing into the reactor for a pre-selected cessation time period. The pulses can be controlled by actuation or modification of an operation of a pump or fan so that an inlet pressure at which the reactant gas is fed into the reactor 21a is changed so that pulses of increased reactant gas flow are fed into the reactor or so that other pulses of reactant gas is fed into the reactor (e.g. pulses of reactant gas are fed such that no reactant gas is fed into the reactor during a cessation time period that extends between pulses of reactant gas). Valves and/or nozzles that are moveable to adjust the flow rate of the reactant gas fed into the reactor can also (or alternatively) be used to control the feeding of pulse of the reactant gas into the reactor. It should be understood that the use of a pump, fan, or other type of fluid inlet pressure control mechanism can be used in combination with or as an alternative to utilization of valves, nozzles and/or other flow control elements for providing the pulses of the reactant gas fed into the reactor 21a.

The pulsing can occur repeatedly and the duration of the pulses and the duration of the cessation time periods can be adjusted or changed to meet a particular design objective or an operational condition of the pre-heater (e.g. flow rates of flue gas and cement raw meal, temperature conditions, pressure conditions, a start-up phase of the pre-heater, a shutdown operational phase of the pre-heater, etc.).

The control of the valves, nozzles, pump, blower, or fan elements that may be utilizable for providing pulses of the reactant gas can be provided by a controller. The controller can be a computer device having hardware that includes a processor connected to non-transitory memory and at least one transceiver. The controller can be communicatively connected to reactant gas flow control elements (e.g. fan, blower, pump, valves, nozzles, flow sensors, temperature sensors, pressure sensors, etc.) to communicate with these elements and/or control those elements for feeding the reactant gas into the middle portion 21d of the reactor 21a in pulses.

Exemplary pulse time periods can be configured to facilitate microsecond or millisecond pulses of reactant gas being fed into the middle portion 21d (e.g. bottom portion) of the reactor 21a. Of course, other pulse time periods could also be used to meet a particular design objective. Exemplary pule time periods can include, for example, up to 1 microsecond, up to 1 millisecond, up to 0.0001 seconds, up to 0.5 seconds, up to 1 second, up to 2 seconds, up to 25 seconds, up to a minute, up to 0.01 seconds, up to 5 milliseconds, up to 10 milliseconds, etc. The exemplary cessation time periods can be configured to be a time period that matches the pulse time period or another time period, such as, for example, up to 1 microsecond, up to 1 millisecond, up to 0.0001 seconds, up to 0.01 seconds, up to 5 milliseconds, up to 10 milliseconds, up to 0.5 seconds, up to 1 second, up to 2 seconds, up to 25 seconds, up to a minute, etc.

The pulse time period and the cessation time periods can be varied for each reactor and can also be varied for different reactors in a particular pre-heater depending on the position of the reactor and the operational objective for that reactor in the pre-heater 2. For example, the pulse time period and the cessation time period can be varied during operations to account for operational parameters of a pre-heater or to meet a particular set of operational objectives. In some embodiments, it is contemplated that a proportion of the reactant gas can be fed at a constant flow rate. For such embodiments, pulses of the reactant gas can also be fed into the reactor to increase the flow of the reactant gas in pulses. The pulsing of the reactant gas can occur to supplement a constant flow of the reactant gas to provide pulses of increased flow rates of the reactant gas.

For each reactor 21a of a pre-heater, the duration of cessation time periods between pulses and the pulse time period can be varied during operations. The varying of such time periods can occur to account for a detected operational parameter of the pre-heater to meet a particular set of operational objectives. The control of the pulsations of reactant gas (and or transport gas) can be defined by a control loop that is run by a controller. The running of the control loop can result in variations in pulse time and cessation times. The variations in such time periods can be due to how the control loop is defined and sensed conditions that are defined in the control loop for adjusting the pulses fed into a reactor to meet a particular set of pre-defined operational objectives. It should be understood that a different control loop can be utilized for controlling pulses of reactant gas and/or transport gas fed for different reactors within a pre-heater. For example, different pulse parameters may be utilized for different control loops used for different reactors 21a to account for reactor positioning and the operational conditions that are expected to be present due to the different positions of the reactors in the preheater. Different controllers may run these different control loops or a single controller may implement multiple control loops assigned to different reactors within a preaheater.

An exemplary size range for cement raw meal can be in the 100-1 micrometer range, in the 150-0 micrometer range, or in other small sized ranges. Powders having such small particulate sizes can agglomerate together—and are commonly classified as Geldart Group C particles. We have determined that this can result in flows of gas through a powder bed having a high downward particle flow and poor gas/solids contact due to channeling that can result from particle agglomeration. Such factors can result in poor heat and mass transfer due to the minimal inter-contact the particles have with the gas. We have determined that the use of pulses of gas can help prevent particle agglomeration and the formation of channeling. This can help provide a greatly improved particle flow rate and improved gas/solids contact, which can allow for significantly more efficient heat and mass transfer. The use of pulses of gas in combination with a generally U-shaped or V-shaped type structure for the reactor 21a in which a middle portion 21d of the reactor is a bottom of the reactor can also help contribute to the reduction (if not elimination) of channeling and a greatly improved downward particle rate so that there is a significantly greater solid/gas contact time for heat and mass transfer to occur between the reactant gas and the cement raw meal. Such features can greatly contribute to provide improved inter-reactions between the reactant gas and the cement raw meal so that the reactant gas is able to effectively adsorb and/or absorb elements from the cement raw meal to reduce undesired emissions from the pre-heater and/or the plant.

The middle portion 21d of the reactor 21a that defines or is a bottom of the reactor can be any intermediate portion between the first end 21b and the second end 21c. In some embodiments, the middle portion 21d of the reactor that is the bottom of the reactor 21a can be a central portion of the reactor 21a between the first end 21b and the second end 21c as such positioning can help provide a desired flow profile for reactant gas/cement raw meal contact. In other embodiments, the middle portion 21d can be an off-center intermediate portion of the reactor 21a between the first end 21b and the second end 21b of the reactor.

The cement raw meal flow passed through reactor 21a can include various constituent elements that are undesirable, such as mercury (Hg), ammonia, etc. The reactant gas can be selected or configured to remove or reduce such undesirable elements. For instance, the composition and temperature of the reactant gas and the flow rate of the reactant gas to be pulsed through the reactor 21a can be any of a number of suitable values that meet a particular set of design criteria for abatement of one or more undesired elements. For example, the reactant gas source 33 can provide a reactant gas that include halides that are configured to oxidize mercury (Hg) within the raw meal so that the mercury to bind the mercury to the cement raw meal passed through the reactor 21a so that the mercury is not within the gas that is emitted out of the pre-heater 2 (e.g. via the down corner, etc.).

The reactant gas fed via the reactant gas source 33 can also (or alternatively) include one or more other constituents for processing the cement raw meal to remove or try to otherwise mitigate undesired compositional elements from the cement raw meal passing through the reactor 21a. For instance, the reactant gas of the reactant gas source 33 can include compressed air or oxygen ($O_2$) enriched compressed air that can be configured to shift the reaction products from thermal conversion of organic nitrogen species present in the cement raw meal from ammonia ($NH_3$) to nitrous oxides ($NO_x$). Such processing can reduce $NH_3$ emissions while it may only slightly increase $NO_x$ emissions. As permissible $NO_x$ emission levels are often higher than permissible $NH_3$ emission levels, such a change in emission constituents can greatly improve the emission levels of emissions from the plant and/or the pre-heater 2. The reactant gas from the reactant gas source 33 can also (or alternatively) have a composition and temperature that is configured to facilitate mitigation of sulfur dioxide ($SO_2$) emissions (which can be significant for cement raw meal that includes pyritic sulfides), hydrogen chloride (HCl) emissions, help reduce total organic carbon (TOC) emissions, and/or to help reduce emissions of other elements.

The reactant gas passed through the reactor 21*a* at the middle portion 21*d* to contact the cement raw meal can be passed through the reactor 21*a* toward its first end 21*b* for being output via a reactant gas outlet conduit 23. The reactant gas outlet conduit 23 can be connected to the down corner connected to the top separator device 3 for output of the utilized reactant gas. The processed raw meal fed into the flue gas conduit 7 from the reactor 21*a* can be fed to another separator device 3 via the flue gas passing through the flue gas conduit 7 so that the cement raw meal can be further pre-heated and subsequently separated from the flue gas.

A transport gas source 35 (shown in broken line in FIG. 2) can also be connected to the middle portion 21*d* of the reactor 21*b* to help facilitate transport of the reactant gas through the reactor 21*a* and/or to help facilitate pulsing of the reactant gas at a sufficient flow rate and/or to help facilitate a desired flow rate of the cement raw meal through the reactor 21*a*. The transport gas can also function to help strip elements from the cement raw meal passed through the reactor and remove undesireable constituents from the cement raw meal that are removal via the transport gas after the cement raw meal has reacted with the reactant gas in the reactor 21*a*. The transport gas can be any suitable gas such as air, compressed air, nitrogen ($N_2$) or another suitable gas that meets a pre-selected design criterion. The flow rate and pulse durations at which the transport gas is fed to the reactor 21*a* can be controlled in the same way that the reactant gas flow is controlled (e.g. use of valves, pumps, fans, a controller, and/or other elements).

For example, the control of the valves, nozzles, pump, blower, or fan elements that may be utilizable for providing pulses of the transport gas can be provided by a controller. The controller can be a computer device having hardware that includes a processor connected to non-transitory memory and at least one transceiver. The controller can be communicatively connected to the transport gas flow control elements (e.g. fan, blower, pump, valves, nozzles, flow sensors, temperature sensors, pressure sensors, etc.) to communicate and/or control those elements for feeding the transport gas into the middle portion 21*d* of the reactor 21*a* in pulses. The controller utilized for control of the transport gas can be can be the same controller as may be used for controlling the pulsing of the reactant gas or can be a separate controller.

In some embodiments, it is also contemplated that a proportion of the transport gas can be fed at a constant flow rate. For such embodiments, pulses of the transport gas can also be fed into the reactor to increase the flow of the transport gas in pulses. The pulsing of the transport gas can also occur to supplement a constant flow of the transport gas to provide pulses of increased flow rates of the reactant gas.

In embodiments in which the reactant gas and the transport gas are both fed to the reactor via pulses, the reactant gas can be fed into the reactor at a bottom middle portion 21*d* so that the reactant gas moves from the middle portion 21*d* to the first end 21*b* of the reactor 21*a*. For reactor shapes having a U-like, or V-like shape, such upward flow of the reactant gas can drive the reactant gas to move toward the reactant gas outlet conduit 23 after having contact with the cement raw meal passing from the first end 21*b* to the middle portion 21*d*. The transport gas can be fed from the transport gas source (e.g. compressed air, a fan in fluid connection with the atmosphere for driving air to the reactor 21*a*, etc.) via pulses so that the transport gas passes from the middle portion 21*d* of the reactor to the second end 21*c* of the reactor. The motion of the transport gas can function to strip off undesired species from the cement raw meal that may be present so that such undesired species is mixed with the flue gas to be passed through the pre-heater 2. The pulsed transport gas can also help drive the cement raw meal to the second end 21*c* of the reactor 21*a* for being fed into a flue gas conduit 7 for directing the processed cement raw meal to a downstream separator device 3 for separation from the flue gas and further pre-heating.

Figure 3:
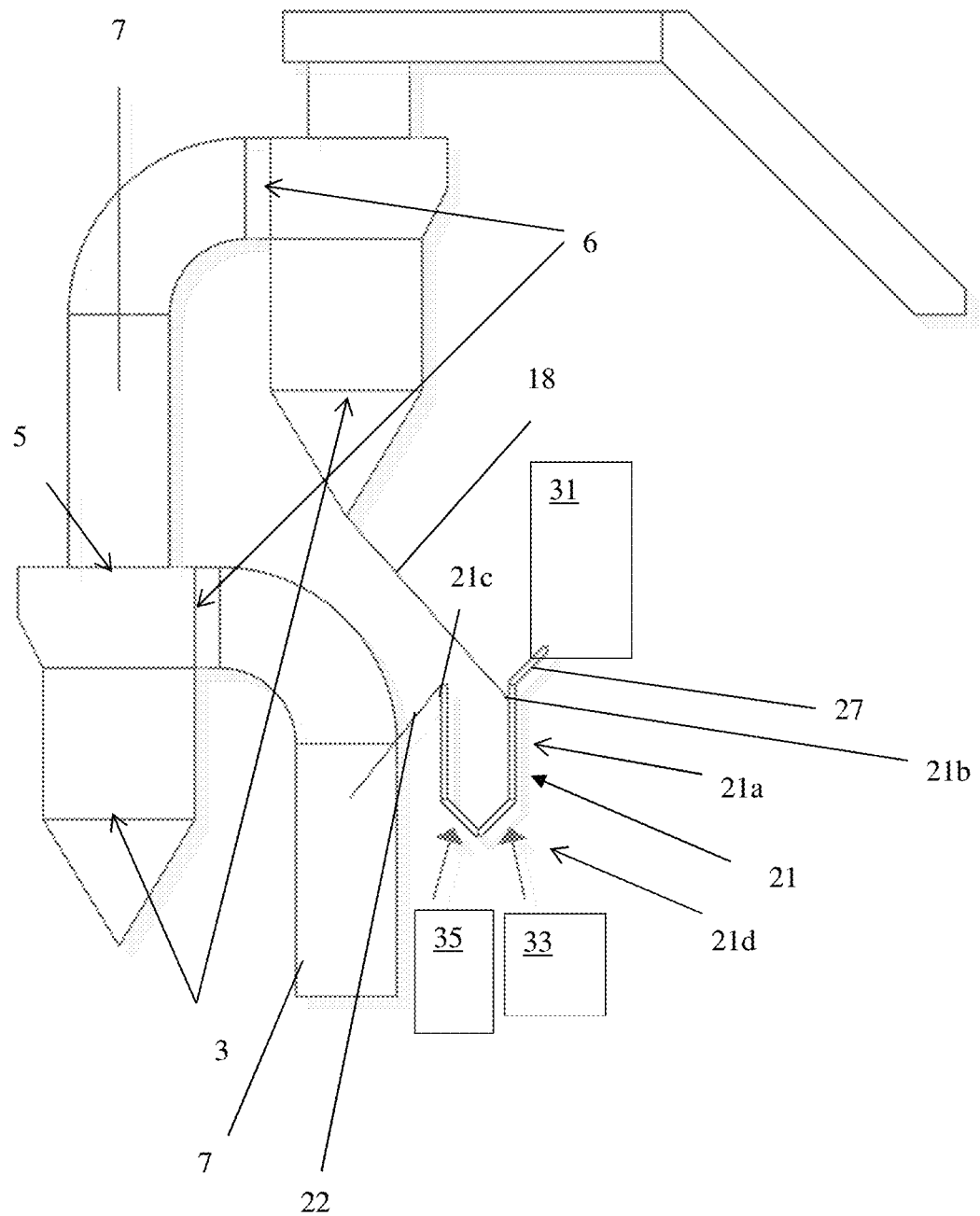
FIG. 3 is a fragmentary schematic view of an exemplary emission abatement apparatus that can be included in the first exemplary embodiment of the cement manufacturing plant.

Referring to FIG. 3, the emission control apparatus 21 can be positioned between an upper separator device 3 and a lower separator device 3 of the pre-heater 2 to receive cement raw meal output from the upper separator device 3 via a cement raw meal conduit 18 connected to the cement raw meal outlet of that separator device 3. In some embodiments, the upper separator device 3 may be a top separator device or a second-highest separator device 3 (e.g. a second stage separator device). The lower separator device 3 can be a lower stage separator device 3 (e.g. a second stage separator device if the upper separator device is the first stage device, a third stage separator device if the upper separator device is the second stage device, etc.).

The cement raw meal can pass through the first end 21*b* of the reactor 21*a* and be moved toward the second end 21*c* of the reactor 21*a*. Pulses of reactant gas and transport gas from reactant gas source 33 and transport gas source 35 can be fed to the middle portion 21*d* of the reactor to process the raw meal to try and reduce certain undesired emissions (e.g. mercury, ammonia, etc.) at a desired rate within desired operational parameters. In some embodiments, the reactant gas can be fed into the reactor 21*a* so that the reactant gas passes from the middle portion 21*d* of the reactor to the first end of the reactor 21*b* for contacting the cement raw meal within the initial leg, or passageway of the reactor 21*a* prior to being output via a gas output conduit 27 that is coupled to a treatment device to transport the used reactant gas to the treatment device 31. The treatment device 31 can be a device remote from the pre-heater 2 or that is positioned on or adjacent the pre-heater 2. The treatment device 31 can be configured to reduce the $NO_x$ composition within the used reactant gas, reduce $NH_3$ within that used reactant gas, or otherwise process the used reactant gas to remove undesired constituent elements that the reactant gas absorbed and/or adsorbed from the cement raw meal when passing through the reactor 21*a*. The treatment device 31 can include, for example, a wash unit that may provide a liquid wash to the gas flow, a filtration device that may filter out certain constituent elements from the gas, and/or other treatment mechanisms configured to reduce undesired constituents from the gas that is ultimately emitted from the plant 100.

The transport gas can be fed into the reactor 21*a* via the transport gas source 35 being in fluid communication with the middle portion 21*d* of the reactor 21*a*. The transport gas can also be fed into the reactor 21a via pulses. The transport gas may be directed into the reactor 21a so that the transport gas functions as a stripping gas that is pulsed through the reactor 21a from the middle portion 21d of the reactor to the second end 21c of the reactor 21a. The transport gas can be of a sufficient temperature and composition to help remove undesired species from the cement raw meal so that the undesired elements are absorbed and/or adsorbed in the transport gas. The transport gas can then mix with the flue gas in the flue gas conduit 7 to which the second end 21c of the reactor is connected so that the undesired species stripped from the cement raw meal by the transport gas is passed through the pre-heater and directed to the down corner for emitting from the plant 100 and/or other processing.

Referring to FIGS. 4 and 5, some embodiments of the emission abatement apparatus 21 can be configured to include a reactor 21a that is configured as multiple reactors 21a in series, such as a reactor having a W-like shape or can be considered to be an emission abatement apparatus 21 having multiple reactors arranged in series. It should be understood that a reactor having a W-like shape need not have angled vertical segments. The vertical segments can be perfectly vertical instead of extending at an angle such that the segments extend vertically and horizontally. For example, a W-like shape could have a "UU" type configuration in addition to a "W" shaped configuration and/or a "VV" type configuration.

In some embodiments, a first reactor 21a can receive cement raw meal via its first end 21b and feed cement raw meal from its second end 21c directly into a first end 21b of a second reactor 21a. In yet other embodiments, a third reactor can be positioned downstream of the second reactor in series with the first and second reactors to directly receive cement raw meal from the second reactor. In other embodiments, the emission abatement apparatus 21 may only have two reactors or may have more than three reactors. For embodiments of the emission abatement apparatus 21 having multiple reactors 21a aligned in series, the emission abatement apparatus 21 can also (or alternatively) be considered to be configured as a single reactor having multiple reactor stages 21k that are arranged in series (e.g. the first reactor can be considered the first reactor stage and the second reactor can be considered the second reactor stage and (if present) the third reactor can be considered the third reactor stage, etc.). The middle portion 21d of each reactor stage 21k can be a middle portion of the single reactor for such an emission abatement apparatus 21.

In some embodiments of the emission abatement apparatus 21 that can be configured to include multiple reactor stages 21k or multiple reactors 21c, the emission abatement apparatus 21 can be configured to help define a flow path for cement raw meal for processing of the raw meal within the apparatus 21. For instance, the first reactor 21a (or first reactor stage 21o) can have a first end 21b that receives cement raw meal from a cement raw meal outlet conduit 18. The first reactor 21a (or reactor stage 21o) can be configured to have a generally U-like shape or V-like shape so that the cement raw meal passes from the first end 21b toward a second end 21c of that stage so that the cement meal passes through a lower middle portion 21d that is lower than the first end 21b and lower than the second end 21c. The flow path of this middle portion can be a first middle portion 21g that is located between the first end 21b and an upper outlet end 21r of the first stage 21o.

The outlet end 21r of the first reactor stage 21O can be in fluid communication with a first end 21s of the second reactor stage 21p so that the cement raw meal from the first reactor stage 21O can be fed directly from the first reactor stage 21O to the second reactor stage 21p. The second reactor stage 21p can include a body that defines a passageway from its first end 21s to its second end 21z so that cement raw meal is passable through a middle portion 21h of the second reactor stage 21p between its first end 21s and second end 21z. The second reactor stage 21p can also include a bypass passageway 21y that extends from the first end 21s to the second end 21z so that fluid can be passed through the second reactor stage 21p without passing through the middle portion 21h region of the second reactor stage 21p. This bypass passageway 21y can be positioned above the middle portion 21h of the second reactor stage 21p and also extend linearly between the first and second ends 21s and 21z of the second reactor stage 21p. It is possible that some cement raw meal can pass through the bypass passageway 21y instead of flowing through the middle portion 21h of the second reactor stage 21p.

A valve or other elements can be located at each end (or at least the upper end 21v that is in fluid communication with the upper first end 21s of the second reactor stage 21p) of the bypass passageway 21y to adjust an amount of cement raw meal that may be passable through the bypass passageway (e.g. a valve can be closed to prevent cement raw meal or fluid from passing through the passageway and can be opened to different open positions (e.g. between fully opened, substantially opened, partially opened, and closed, etc.) to allow more or less fluid and more or less cement raw meal to pass through the passageway for bypassing the middle portion 21h of the second reactor stage 21p.

The middle portion 21h of the second reactor stage 21p can be positioned below the middle portion 21g of the first reactor stage 21o. The lower position can be defined by a length of the passageway 21t extending from the first end 21s of the second reactor stage 21p to the middle portion 21h of the second reactor stage 21p. The length of this passageway 21t can be 2-5 (e.g. 3 or 3.73, etc.) times longer than the length of the passageway of the first reactor stage 21O that extends from the middle portion 21g of the first reactor stage 21O to the mouth of the first end 21r that is in fluid communication with the mouth of the first end 21s of the second reactor stage 21p.

The dimensions of the first and second reactor stages 21O and 21p can be different or the same. For instance, in some embodiments, the reactor passageways for the first reactor stage 21O can have a smaller diameter or width and a smaller length than corresponding passageways of the second reactor stage 21p. The passageways of the second reactor stage 21p can have a wider or larger diameter and also include longer passageway segments. For instance, the length and width of the passageway of the second reactor 21p that extends from the middle portion 21h of the second reactor stage 21p to the inlet mouth of the first end 21s of the second reactor stage 21p can both be greater than the length and width of the corresponding passageway of the first reactor 21O that extends from the inlet mouth of the first end 21b to the middle portion 21g of the first reactor stage 21o. As another example, the length of the output passageway 21x of the second reactor 21p that extends from the middle portion 21h of the second reactor 21p to the outlet mouth of the second end 21z can be longer than the corresponding outlet passageway of the first reactor stage 21O that extends from the middle portion 21g of the first reactor stage 21O to the outlet mouth of the second end 21r of the first reactor stage 21o. The internal diameter or width of the passageways of the second reactor stage $21p$ can also be larger than the internal diameter or width of the passageways of the first reactor stage $21o$.

In yet other embodiments, in which a third reactor stage is included, the lengths of corresponding passageways and internal diameter or width of such passageways can be larger or smaller than the passageways of the second reactor stage $21p$. In yet other embodiments, it is contemplated that the first reactor stage $21o$ can have passageways that correspond to passageways of the second reactor stage $21p$ that are larger in length and/or internal width or diameter.

The middle portion $21g$ of the first reactor stage $21o$ can be connected to a source of reactant gas $33$ and a source of transport gas $35$. The middle portion $21h$ of the second reactor stage $21p$ can also be connected to a source of reactant gas $33$ and a source of transport gas $35$. The second reactor stage $21p$ can be connected to the same sources of reactant gas and transport gas as the first reactor stage $21o$ or additional sources. Pulses of a reactant gas can be passed into the reactor stages $21k$ at the bottom portion or middle portions $21g$ and $21h$ from a reactant gas source $33$. The flow rate and duration of the flow of reactant gas from the reactant gas source(s) $33$ to the first reactor stage $21o$ can be controlled via a valve between the reactant gas source $33$ and the reactor $21a$ that is connected to a reactant gas source feed conduit through which the reactant gas passes to be fed from the reactant gas source $33$ to the middle portion $21g$ of the first reactor stage $21o$. In addition (or as an alternative), a pump, fan, or other type of fluid inlet pressure control mechanism can operate at different settings to change an inlet pressure for the reactant gas being fed into the first reactor stage $21o$ for providing the pulses of the reactant gas fed into the first reactor stage $21o$.

The flow rate and duration of the flow of reactant gas from the reactant gas source(s) $33$ to the second reactor stage $21p$ can also be controlled via a valve between the reactant gas source $33$ and the second reactor stage $21p$ that is connected to a reactant gas source feed conduit through which the reactant gas passes to be fed from the reactant gas source $33$ to the middle portion $21h$ of the second reactor stage $21p$. The flow of reactant gas can also be controlled by controlling valves or nozzles at the reactant gas feed inlets in the middle portions $21d$ of the reactor at which the reactant gas is passed into the reactor for contact with the cement raw meal passing through the reactor. In addition (or as an alternative), a pump, fan, or other type of fluid inlet pressure control mechanism can operate at different settings to change an inlet pressure for the reactant gas being fed into the second reactor stage $21p$ for providing the pulses of the reactant gas fed into the second reactor stage $21p$.

The pulsing of the reactant gas can be controlled so that the pulses occur at certain intervals. For example, each pulse of the reactant gas can occur such that the gas is passed into the first reactor stage $21o$ continuously for a pre-selected pulse time period and, at the end of the pre-selected pulse time period, the reactant gas is prevented from flowing into the reactor for a pre-selected cessation time period. As another example, each pulse of the reactant gas can occur such that the gas is passed into the second reactor stage $21p$ continuously for a pre-selected pulse time period and, at the end of the pre-selected pulse time period, the reactant gas is prevented from flowing into the reactor for a pre-selected cessation time period. The pulsing can occur repeatedly and the duration of the pulses and the duration of the cessation time periods can be adjusted or changed to meet a particular design objective or an operational condition of the pre-heater (e.g. flow rates of flue gas and cement raw meal, temperature conditions, pressure conditions, a start-up phase of the pre-heater, a shutdown operational phase of the pre-heater, etc.). The pulsations at which the reactant gas is fed into the first and second reactor stages $21o$ and $21p$ can be synchronous (e.g. at the same time and at the same pulse duration) or asynchronous (e.g. at different times or at different times and at different pulse durations).

For all embodiments, the control of the valves, nozzles, pump, blower, or fan elements that may be utilizable for providing pulses of the reactant gas can be provided by a controller. The controller can be a computer device having hardware that includes a processor connected to non-transitory memory and at least one transceiver. The controller can be communicatively connected to reactant gas flow control elements (e.g. fan, blower, pump, valves, nozzles, flow sensors, temperature sensors, pressure sensors, etc.) to communicate with these elements and/or control those elements for feeding the reactant gas into the middle portion $21d$ of the reactor $21a$ in pulses.

A transport gas source $35$ (shown in broken line in FIG. 2) can also be connected to the middle portion $21d$ of the reactor $21b$ to help facilitate transport of the reactant gas through the reactor $21a$ and/or to help facilitate pulsing of the reactant gas at a sufficient flow rate and/or to help facilitate a desired flow rate of the cement raw meal through the reactor $21a$. The transport gas can also function to help strip elements from the cement raw meal passed through the reactor and remove undesirable constituents from the cement raw meal that are removal via the transport gas after the cement raw meal has reacted with the reactant gas in the reactor $21a$. The transport gas can be any suitable gas such as air, compressed air, nitrogen ($N_2$) or another suitable gas that meets a pre-selected design criterion. The flow rate and pulse durations at which the transport gas is fed to the reactor $21a$ can be controlled in the same way that the reactant gas flow is controlled (e.g. use of valves, pumps, fans, a controller, and/or other elements).

For example, the control of the valves, nozzles, pump, blower, or fan elements that may be utilizable for providing pulses of the transport gas can be provided by a controller. The controller can be a computer device having hardware that includes a processor connected to non-transitory memory and at least one transceiver. The controller can be communicatively connected to the transport gas flow control elements (e.g. fan, blower, pump, valves, nozzles, flow sensors, temperature sensors, pressure sensors, etc.) to communicate and/or control those elements for feeding the transport gas into the middle portion $21d$ of the reactor $21a$ in pulses. The controller utilized for control of the transport gas can be can be the same controller as may be used for controlling the pulsing of the reactant gas or can be a separate controller.

A transport gas can also be fed into each reactor stage of the emission abatement apparatus $21$ so that transport gas and reactant gas are both fed to the reactor via pulses, the reactant gas can be fed into the reactor at middle portions $21d$ so that the reactant gas moves from the middle portion $21d$ to the first end $21b$ of the reactor $21a$. For reactor stage shapes having a U-like, or V-like shape, such upward flow of the reactant gas can drive the reactant gas to move toward a reactant gas outlet conduit $23$ in fluid communication with the first end $21b$ of the reactor after having contact with the cement raw meal passing from the first end $21b$ to the middle portion $21g$ of the first reactor stage $21o$ or the first end $21s$ of the second reactor stage $21p$ to the middle portion $21h$ of the second reactor stage $21p$. The transport gas can be fed from the transport gas source $35$ (e.g. compressed air, a fan in fluid connection with the atmosphere for driving air to the reactor 21a, etc.) via pulses so that the transport gas passes from the middle portion 21g of the first reactor stage 210 to the second end 21c of the reactor and so that the transport gas is fed within the second reactor stage 21p adjacent the middle portion 21h of the second rector stage 21p to facilitate transport of the cement raw meal from the middle portion 21h of the second reactor stage 21p toward the second end 21c of the reactor. The feeding of the transport gas and motion of this gas can also function to strip off undesired species from the cement raw meal that may be present so that such undesired species is mixed with the flue gas to be passed through the pre-heater 2. The pulsed transport gas can also help drive the cement raw meal to the second end 21c of the reactor 21a for being fed into a flue gas conduit 7 for directing the processed cement raw meal to a downstream separator device 3 for separation from the flue gas and further pre-heating. The pulsed transport gas can also be pulsed such that at least a portion of the transport gas is driven to the bypass passageway 21y for passing through the bypass passageway 21y. A gas conduit for outputting the transport gas with any elements stripped from the cement raw meal can be connected to the bypass passageway for output of that gas to a downcomer, a flue gas conduit, a conduit for transporting the gas to a treatment device 31 or other element of a cement raw meal manufacturing facility.

Exemplary pulse time periods can be configured to facilitate microsecond or millisecond pulses of reactant gas being fed into the middle portions 21d (e.g. middle portion 21g of the first reactor stage 210 and middle portion 21h of the second reactor stage 21p) of the reactor. Of course, other pulse time periods could also be used to meet a particular design objective. Exemplary pulse time periods can include, for example, up to 1 microsecond, up to 1 millisecond, up to 0.0001 seconds, up to 0.5 seconds, up to 1 second, up to 2 seconds, up to 25 seconds, up to a minute, up to 0.01 seconds, up to 5 milliseconds, up to 10 milliseconds, etc. The exemplary cessation time periods can be configured to be a time period that matches the pulse time period or another time period, such as, for example, up to 1 microsecond, up to 1 millisecond, up to 0.0001 seconds, up to 0.01 seconds, up to 5 milliseconds, up to 10 milliseconds, up to 0.5 seconds, up to 1 second, up to 2 seconds, up to 25 seconds, up to a minute, etc.

The pulse time period and the cessation time periods can be varied for each reactor and can also be varied for different reactors in a particular pre-heater depending on the position of the reactor and the operational objective for that reactor in the pre-heater 2. For example, the pulse time period and the cessation time period can be varied during operations to account for operational parameters of a pre-heater or to meet a particular set of operational objectives. In some embodiments, it is contemplated that a proportion of the reactant gas can be fed at a constant flow rate. For such embodiments, pulses of the reactant gas can also be fed into the reactor to increase the flow of the reactant gas in pulses. The pulsing of the reactant gas can occur to supplement a constant flow of the reactant gas to provide pulses of increased flow rates of the reactant gas. In some embodiments, it is also contemplated that a proportion of the transport gas can be fed at a constant flow rate. For such embodiments, pulses of the transport gas can also be fed into the reactor to increase the flow of the transport gas in pulses. The pulsing of the transport gas can also occur to supplement a constant flow of the transport gas to provide pulses of increased flow rates of the reactant gas. In other embodiments, the pulses can be fed into a reactor without any constant flow of a gas always being fed therein such that during a cessation time period of a pulse there is no flow of that gas being fed into the reactor 21a or a reactor stage 21k. For instance, during a cessation time period of a pulse of a reactant gas, there may not be any flow of reactant gas fed into a reactor stage during that cessation time period and during a cessation time period of a pulse of transport gas there may not be any flow of a transport gas fed into the reactor stage during that cessation time period.

Referring to FIG. 6, an exemplary method for retrofitting a pre-existing plant with one or more emission abatement apparatuses 21 and subsequently running the plant is provided in steps S101-S105. These steps include S101 in which at least one emission abatement mechanism is installed in a cement manufacturing facility that processes raw meal in the cement clinker production process. The method can also include step S102 in which cement raw meal is passed from a first separator device 3 to a second separator device via a conduit such that the cement raw meal is passed through a reactor as the raw meal moves from the first separator device 3 to the second separator device 3. In step S103, gas can be introduced into the reactor (e.g. reactant gas, reactant gas and transport gas, etc.) in pulses. The pulses of gas can be spaced apart duration of a cycle of feeding gas into the reactor 21a at which a continuous flow of gas is passed into the reactor 21a at a pre-selected flow rate and subsequently the flow of gas is stopped for a cessation time period that runs immediately after the pulse time period ends for a cessation time period. The cessation and pulse time periods can each be in the range of 0.5-5 milliseconds or some other time range as discussed herein (e.g. microsecond pulse range, millisecond pulse range, centisecond pulse range, etc.) and can be controlled as discussed herein. In step S104, the cement raw meal (along with any pulsed transport gas used to strip undesired species from the cement raw meal) can be output from the reactor 21a to the second separator device 3 via a flue gas feed conduit 7 to which the reactor 21a is connected (e.g. via a cement raw meal outlet conduit 22). Pulsed reactant gas passed through the reactor 21a to remove undesired species from the cement raw meal can be output from the first end 21b of the reactor 21a and output to a treatment device 31 or a down corner for further processing and/or emission to the atmosphere. The cement raw meal output from the second end 21c of the reactor 21a can be passed through further separator devices 3 of the pre-heater 2 and, as indicated in step S105, can thereafter be fed to a calciner or kiln. While the cement raw meal output from the reactor 21a can undergo further preheating and separation from the flue gas via one or more other separator devices 3, it is also contemplated that, for some embodiments, the cement raw meal output from the second end 21c of the reactor may not be passed through any further separator devices and may instead be directly fed to the calciner 4.

A kit can be provided to facilitate installation of at least one emission abatement apparatus 21. The kit can include at least one reactor 21a. The kit can also include other elements such as conduits, valves, sensors, at least one controller, design plans, installation equipment and/or installation tools. Such a kit can be offered for sale and/or used for retrofitting a conventional plant or pre-heater to include one or more emission abatement apparatuses 21. For example, an embodiment of the kit can be utilized for installation of at least one emission abatement apparatus 21 in a pre-heater 2, in a plant 100, or in another type of mechanism that may utilize a flow of solid particulate material that has a relatively small size range such as a powder-like size range (e.g. inclusion in conjunction with a pulverized material stream from a crushing circuit or comminution circuit that may provide material for subsequent processing).

The size and shape of the reactor 21a can be structured to try and minimize any change in height of a pre-existing pre-heater 2 and/or to allow for a compact a pre-heater 2 to accommodate a particular set of design criteria. This can be particularly helpful in retrofitting operations as use of certain shaped reactors 21a can be designed to fit within a pre-existing pre-heater 2. For example, a U-shaped or V-shaped reactor or other shaped reactor in which the inlet and outlet heights (e.g. height of the first and second ends 21b and 21c) can be offset to a relatively minor degree can allow for an emission abatement apparatus 21 to be provided by a gas contacting the cement raw meal without a significant change in the structure of a pre-heater 2 or a need to change the height of a pre-heater 2 that is to be retrofitted with at least one emission abatement apparatus 21.

Embodiments of the reactor 21a of the emission abatement apparatus 21 can be configured to provide an efficient mechanism by which a reactant gas can be contacted with powder (e.g. cement raw meal sized particulates having a relatively small powder-like size) without significantly sacrificing energy loss, requiring increased pre-heater height, requiring use of excessive amounts of reactants, and without requiring excessive gas flows to be passed through the rector 21 for treating the cement raw meal to remove one or more undesired species therefrom. Such benefits can allow for a cost-effective implementation that provides improved performance and improved emissions from the plant 100 and/or pre-heater 2. In addition to providing operational benefits, embodiments of the emission abatement apparatus can have a relatively small footprint that has a negligible affect (if any affect) on the height of a pre-heater, which can help ensure the capital costs associated with including the apparatus in a pre-heater is relatively low. Embodiments of the emission abatement apparatus 21 can therefore provide a cost-effective means for providing improved emissions from a pre-heater and/or a plant 100 in a cost-effective manner. Embodiments of the emission abatement apparatus 21 can be configured to mitigate $SO_2$ emissions (e.g. from pyritic sulfides present in cement raw meal materials), $NH_3$ emissions, Hg emissions, HCl emissions, and/or TOC emissions that can originate from organic material present in the raw meal.

It should be appreciated that different embodiments of the cement manufacturing plant 100 and different embodiments of the emission abatement mechanism can utilize different arrangements to meet a particular set of design criteria. For instance, the geometry, height, width (or diameter) of each separator device 3 can be sized to meet a particular design objective (e.g. account for pre-existing support structure of a plant 100 or pre-heater 2, account for a desired processing capacity, etc.). As another example, the number of separator devices 3 can depend on a particular set of design criteria. In some embodiments, it is contemplated that only one separator device 3 may be needed or only bottom and top separator devices could be needed. In yet other embodiments, three separator devices 3 can be used or more than four separator devices can be used (e.g. five, six, seven, etc.). The geometry and shape of each body can be any particular configuration that meets a particular set of design criteria. As yet another example, embodiments can be configured so that the size and configuration of feed conduits, flue gas conduits, or other conduits, are configured to meet the flow rates, desired temperature ranges, and desired pressure ranges of operation for the pre-heater 2 and the particular separation devices 3 and other elements included in the pre-heater 2 and/or the operation of the calciner. As yet another example, the type of reactant gas, temperature and flow rate of the reactant gas can have any suitable temperature and suitable composition to account for a specific set of design criteria (e.g. operational profile of the pre-heater 2 or plant 100, species to be removed from the cement raw meal for reduction of a particular type of element (e.g. Hg, $NH_3$, $SO_2$, HCl, TOC, combinations of the same, etc.).

As yet another example, the pulsing of reactant gas and/or transport gas and how such pulsing is controlled and/or provided can be adjusted to meet a particular set of design criteria. Different arrangements and/or combinations of valves, nozzles, pumps, blowers, fans, and/or other flow control elements can be used to provide such pulses to provide a desired reactor bed condition to meet a pre-selected set of operational objectives. The inlet pressure, pule time, cessation time between pulses, compositions of the reactant gas, and/or composition of the transport gas can be varied via such elements during operations to meet a particular set of operational objectives. Such variations can be defined by one or more control loops that are run by one or more controllers to control the operations of these elements in some embodiments. In some embodiments, each such controller can be communicatively connected to a work station running a process control program that an operator may use to adjust different controller settings or control loop settings. Such a work station can also be communicatively connected to sensors, valves, pumps, fans, or other process elements.

As yet another example, embodiments of the emission abatement apparatus 21 can also be included in conjunction with pulverized material streams. Such streams may be provided via grinding or crushing circuits that may process material that is to be fed to another plant process (e.g. before being fed to pre-heater 2, etc.). In some embodiments, it is contemplated that the emission abatement apparatus 21 can be positioned upstream of a pre-heater 2 for treating cement raw meal prior to the cement raw meal being fed to the pre-heater 2, for example. The reactor 21a of such an emission abatement apparatus 21 can be configured to treat halides of the cement raw meal and/or to oxidize the mercury that may be present in the cement raw meal so that the oxidized mercury can be bound to the cement raw meal instead of being stripped from the pre-heated cement raw meal and being emitted in stack gas (which may occur as a result of the cement raw meal being heated as it passes through the pre-heater 2).

In yet other embodiments, it is contemplated that the emission abatement apparatus 21 can be utilized in other plants or processes in which a pulverized solid particulate flow of material having a powder-like size is utilized for treating that powder material. It should therefore be understood that the emission abatement apparatus 21 is not limited to use in conjunction with cement raw meal processing. Other solid particulate materials (in addition to or an alternative to cement raw meal) can be treated in conjunction with the emission abatement apparatus 21 (e.g. the emission abatement apparatus can be utilized in other types of plants or facilities for treating a flow of solid particulate material utilized in the plant or facility).

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

Thus, while certain exemplary embodiments of the emission abatement apparatus, cement manufacturing plant, kit for retrofitting a plant with at least one emission abatement apparatus, and methods of making and using the same have been shown and described above, it is to be distinctly understood that the invention is not limited thereto but may be otherwise variously embodied and practiced within the scope of the following claims.

What is claimed is:

1. A cement manufacturing apparatus comprising:
   a pre-heater connected to a calciner to pre-heat cement raw meal to the calciner, the pre-heater comprising:
   a first separator device;
   a second separator device;
   an emission abatement apparatus configured to mitigate Hg, NH3, SO2, HCl and/or total organic carbon (TOC) emissions from the cement raw meal, the emission abatement apparatus being positioned between the first separator device and the second separator device, the emission abatement apparatus comprising:
      a reactor having a first end, a second end opposite the first end, and at least one middle portion between the first end and the second end;
      the first end of the reactor connected to a cement raw meal conduit so that the cement raw meal output from the first separator device is feedable to the first end of the reactor;
      the second end of the reactor connected to a flue gas conduit such that the cement raw meal passed through the reactor is passable from the second end of the reactor to the flue gas conduit so that the cement raw meal is directed to the second separator device via the flue gas conduit;
      the at least one middle portion of the reactor being connectable to a source of reactant gas such that reactant gas from the source of reactant gas is feedable into the middle portion of the reactor in a plurality of pulses; and
      the reactor further comprising a bypass passageway extending from the first end of the reactor to the second end of the reactor, the bypass passageway positioned above the middle portion of the reactor.

2. The cement manufacturing apparatus of claim 1, wherein the at least one middle portion of the reactor is comprised of an intermediate section of the reactor between the first end of the reactor and the second end of the reactor and the middle portion of the reactor is below the first end of the reactor and is below the second end of the reactor.

3. The cement manufacturing apparatus of claim 2, wherein a controller is configured such that the gas flow control mechanism provides the plurality of pulses of the reactant gas so that each pulse has a pre-selected pulse time period at which the reactant gas is fed into the middle portion of the reactor and immediately after the pre-selected pulse time the reactant gas is stopped being fed into the middle portion of the reactor for a cessation time period that runs immediately after the pre-selected pulse time ends.

4. The cement manufacturing apparatus of claim 3, wherein the controller is configured to provide pulses having a pre-selected pulse time of up to 0.01 seconds, 1 microsecond, 1 millisecond, 5 milliseconds, or 1 second.

5. The cement manufacturing apparatus of claim 2, wherein the at least one middle portion of the reactor is connected to a transport gas source such that transport gas is feedable into the middle portion of the reactor in a plurality of pulses such that the transport gas is passable from the middle portion of the reactor to the second end of the reactor.

6. The cement manufacturing apparatus of claim 5, wherein the at least one middle portion of the reactor is connected to the source of reactant gas such that the reactant gas passes from the middle portion of the reactor to the first end of the reactor.

7. The cement manufacturing apparatus of claim 2, wherein the reactor has a generally U-shape or a generally V-shape; and wherein the middle portion is a central section of the reactor.

8. The cement manufacturing apparatus according to claim 1, wherein the cement manufacturing apparatus further comprises a controller connected to a reactant gas flow control mechanism.

9. The cement manufacturing apparatus, according to claim 1, wherein a gas conduit for outputting a transport gas with any elements stripped from the cement raw meal is connected to the bypass passageway.

* * * * *